(12) United States Patent
Nakajima et al.

(10) Patent No.: US 12,115,600 B2
(45) Date of Patent: Oct. 15, 2024

(54) SOLDERING IRON TIP CLEANER WITH PLURALITY OF AIR JETS

(71) Applicant: SHORITSU ELECTRIC INDUSTRY CO., LTD., Kawasaki (JP)

(72) Inventors: Kosuke Nakajima, Mishima (JP); Shinobu Yamamoto, Mishima (JP); Takeshi Mimura, Mishima (JP)

(73) Assignee: SHORITSU ELECTRIC INDUSTRY CO., LTD., Kanagawa (JP)

( * ) Notice: Subject to any disclaimer, the term of this patent is extended or adjusted under 35 U.S.C. 154(b) by 502 days.

(21) Appl. No.: 17/438,028

(22) PCT Filed: Mar. 10, 2020

(86) PCT No.: PCT/JP2020/010153
§ 371 (c)(1),
(2) Date: Sep. 10, 2021

(87) PCT Pub. No.: WO2020/184534
PCT Pub. Date: Sep. 17, 2020

(65) Prior Publication Data
US 2022/0143727 A1 May 12, 2022

(30) Foreign Application Priority Data
Mar. 13, 2019 (JP) ................... 2019-045779

(51) Int. Cl.
B23K 3/02 (2006.01)
B08B 5/02 (2006.01)
B23K 3/08 (2006.01)

(52) U.S. Cl.
CPC ............. B23K 3/028 (2013.01); B08B 5/02 (2013.01); B23K 3/08 (2013.01)

(58) Field of Classification Search
CPC .......... B23K 1/018; B23K 37/08; B23K 3/02; B23K 3/08; B23K 3/028; B08B 5/02
See application file for complete search history.

(56) References Cited

FOREIGN PATENT DOCUMENTS

| CN | 104625404 A | * | 5/2015 |
| JP | S60-42461 U | | 3/1985 |
| JP | 09308966 A | * | 12/1997 |
| JP | H10-58137 A | | 3/1998 |
| JP | 2015-221449 A | | 12/2015 |
| JP | 2018-079482 A | | 5/2018 |

* cited by examiner

Primary Examiner — Eric J Rosen
Assistant Examiner — John C Merino
(74) Attorney, Agent, or Firm — HAUPTMAN HAM, LLP

(57) ABSTRACT

The present invention is to provide a mechanism that does not cause a situation such as corrosion of the iron tip with an air nozzle due to blowing off solder from the iron tip of the soldering iron, and a mechanism capable of coping with various shapes of iron tips. In order to achieve the object of the present invention, an iron tip cleaner device for a soldering iron includes a cleaner chamber including a wall surface and an air jetting holes that is provided in the wall surface and jets air for blowing off solder on an iron tip. The solder on the iron tip is blown off by convection air generated when the air jetted from the air jetting holes collides with the wall surface.

11 Claims, 10 Drawing Sheets

Prior Art

Prior Art

SOLDERING IRON TIP CLEANER WITH PLURALITY OF AIR JETS

RELATED APPLICATIONS

The present application is National Phase of International Application No. PCT/JP2020/010153 filed Mar. 10, 2020, and claims priority from Japanese Application No. 2019-045779, filed Mar. 13, 2019, the disclosure of which is hereby incorporated by reference herein in its entirety.

TECHNICAL FIELD

The present invention relates to an iron tip cleaner device for a soldering iron which blows off solder debris adhering to the soldering iron by jetting air and removes the solder debris.

BACKGROUND ART

For example, when soldering is repeatedly performed in a soldering robot device, it is necessary to perform cleaning once every few times to remove unnecessary solder adhering to an iron tip of a soldering iron. For example, when the soldering is performed by the robot device, a program is set such that a soldering work place is provided to be adjacent to a cleaning work place to repeat a process of performing a soldering operation of the soldering iron several times, performing a cleaning operation, and returning to the soldering operation. Conventionally, an example of a cleaning means includes a method of jetting air from an air nozzle to the iron tip to blow off solder, but since the iron tip has various shapes, it is necessary to adjust a direction and a pressure of the air blown to the iron tip according to the shape of the iron tip.

As shown in FIG. 9, Patent Literature discloses a mechanism in which a nozzle member (102) is provided in a cleaner box, an iron tip (105) is inserted into the cleaner box from above, and solder is blown off by air jetted from a nozzle hole. In this mechanism, a cleaner box (101) is provided to accommodate the blown solder, and a jetting angle of the air is changed by change of a posture of the nozzle member (102). Since the soldering is performed while solder is fed, a solder feeder (106) follows the operation of the iron tip (105).

Further, in the industry, solder debris on the iron tip is removed by a mechanism shown in FIG. 10 in many cases. An air nozzle (112) is inserted into a cleaner box (111) in advance, and a soldering iron is inserted into an opening (114), which is provided at a top of the cleaner box, from above to remove solder debris. Air is jetted from the air nozzle to the iron tip, and blown solder falls into the cleaner box (111). In order to remove the solder efficiently, as shown in FIG. 10, two air nozzles (112) are used to jet air in two direction.

A program sets in advance a position where the iron tip stops between two nozzles during cleaning. A position of the air nozzle and an angle of the nozzle facing the iron tip are also set in advance, but are often performed manually by a worker, and thus there is a problem that the position and the angle of the nozzle are differently set depending on the ability of the worker.

The iron tip may come into contact with the nozzle due to a defect in the program, and the position and the angle of the nozzle may deviate. When the position and the angle of the nozzle deviate, cleaning will not be performed sufficiently. Normally, since the work is automatically advanced by a robot, there are problems that the work proceeds to some extent without recognition of deviation and a large loss is caused in such a case.

CITATION LIST

Patent Literature

Patent Literature 1

Japanese Patent Laid-Open No. 2018-79482

SUMMARY OF INVENTION

Technical Problem

An object of the present invention is to provide a mechanism that does not cause a situation such as a collision of an iron tip with an air nozzle during work of blowing solder from the iron tip of a soldering iron.

In addition, an object of the present invention is to provide a mechanism that jets air to the iron tip of the soldering iron to remove solder adhering to the tip, wherein a protruding mechanism such as an air nozzle is not required and adjustment of a direction of the air nozzle by manual work is not required.

In addition, an object of the present invention is to provide a mechanism for jetting air to an iron tip of a soldering iron to remove solder adhering to the iron tip, wherein the mechanism coping with iron tips of various shapes.

In addition, an object of the present invention is to provide a mechanism capable of jetting air having a pressure sufficient to blow off solder from an iron tip.

In addition, an object of the present invention is to provide a mechanism that is not necessary to frequently change a program for allowing the iron tip to moving a cleaning device in a device that automatically performs soldering work with a robot.

Solution to Problem (1) In order to solve the problem, an iron tip cleaner device for a soldering iron includes a cleaner chamber including a wall surface and an air jetting hole that is provided in the wall surface and jets air for blowing off solder on an iron tip. Further, in order to solve the problem, an iron tip cleaner device for a soldering iron includes a cleaner chamber including a wall surface and a plurality of air jetting holes that are provided in the wall surface and jet air for blowing off solder on an iron tip, wherein jetting hole ducts having end portions as the air jetting holes are provided, and a direction of the air jetted into the cleaner chamber is restricted by a direction in which the jetting hole ducts face the cleaner chamber.

(2) The problem is solved by the iron tip cleaner device for a soldering iron characterized in that the solder on the iron tip is blown off by convection air generated when the air jetted from the air jetting holes collides with the wall surface.

(3) The problem is solved by the iron tip cleaner device for a soldering iron characterized in that the cleaner chamber is a cylindrical space and the cleaner chamber includes a top surface on which an opening portion is provided such that the iron tip is inserted and a side surface on which the wall surface is provided.

(4) The problem is solved by the iron tip cleaner device for a soldering iron characterized in that the plurality of air jetting holes are provided are arranged in a row in a horizontal direction.

(5) The problem is solved by the iron tip cleaner device for a soldering iron characterized in that air is jetted from the air jetting holes toward a center of the cleaner chamber in a circumferential direction.

(6) The problem is solved by the iron tip cleaner device for a soldering iron characterized in that jetting hole ducts having end portions as the air jetting holes are provided, and a direction of the air jetted into the cleaner chamber is restricted by a direction in which the jetting hole ducts face the cleaner chamber.

(7) The problem is solved by the iron tip cleaner device for a soldering iron characterized in that the iron tip cleaner device further includes a box that accommodates the blown solder, wherein the cleaner chamber includes a bottom surface on which an opening portion is provided to be opened toward the box.

Instead of the conventional nozzle-shaped mechanism for jetting air to the iron tip, the hole (air jetting hole) is provided in the wall, and thus a situation of collision of the iron tip with the nozzle does not occur. Further, it is not necessary to manually adjust the direction of the air nozzle. The number of air jetting holes, the arrangement of the holes, the size of the holes, and the pressure of the air jetted from the holes can be adjusted according to the shape of the iron tip to be cleaned.

In the present invention, since the air is blown to the iron tip in various directions, the solder on the iron tip having various shapes can be effectively removed.

In the present invention, the air is jetted from a hole having a diameter of about 1.6 mm, for example. As a result, it is possible to jet air having a pressure sufficient to blow off the solder from the iron tip. The diameter of the hole from which the air is jetted can be in a range in which the air having a pressure sufficient to blow off the solder from the iron tip can be jetted.

Further, since the positions of the air jetting holes are defined, it is not necessary to frequently change the program for allowing the iron tip to moving the cleaner device in a device that automatically performs soldering work with a robot.

A space surrounded by the wall provided with the jetting holes can be used as a cleaner chamber. When the air emitted from the jetting hole collides with the wall forming the cleaner chamber, an air vortex is formed in the cleaner chamber. As a result, the solder on the iron tip having various shapes can be blown off. The cleaner chamber is formed in the cylindrical shape, and thus the air emitted from the jetting hole can flow in a swirling direction of the vortex.

The plurality of air jetting holes are disposed side by side in a row in the horizontal direction, and thus it is possible to blow off the solder on the iron tip to be removed over a long distance in the horizontal direction. The air can be jetted with a stronger pressure compared with a case where a slit having a similar length is provided. Depending on the shape of the iron tip, when such air is efficiently blown off, the solder can be blown off efficiently. When the cleaner chamber has the cylindrical shape and the air jetting holes are installed side by side in a row over 360 degrees in the horizontal direction, the air jetted from the air jetting holes can be obtained in a direction of 360 degrees toward the center in the circumferential direction.

The flow of air can also be changed in such a manner of changing the pressure of the air to be jetted or shifting the jetting time for each jetting from the plurality of jetting holes.

Advantageous Effects of Invention

During the work of blowing off the solder from the iron tip of the soldering iron, a situation such as a collision with the air nozzle of the iron tip does not occur. Therefore, it is not necessary to stop the work and adjust the air jetting direction during the work. Further, it is possible to provide a mechanism capable of coping with various shapes of iron tips. Further, it is possible to provide a mechanism capable of jetting air having a pressure sufficient to blow off the solder from the iron tip.

DESCRIPTION OF EMBODIMENTS

Hereinafter, preferred embodiments of the present invention will be described with reference to the drawings.

Example 1

Figure 1:
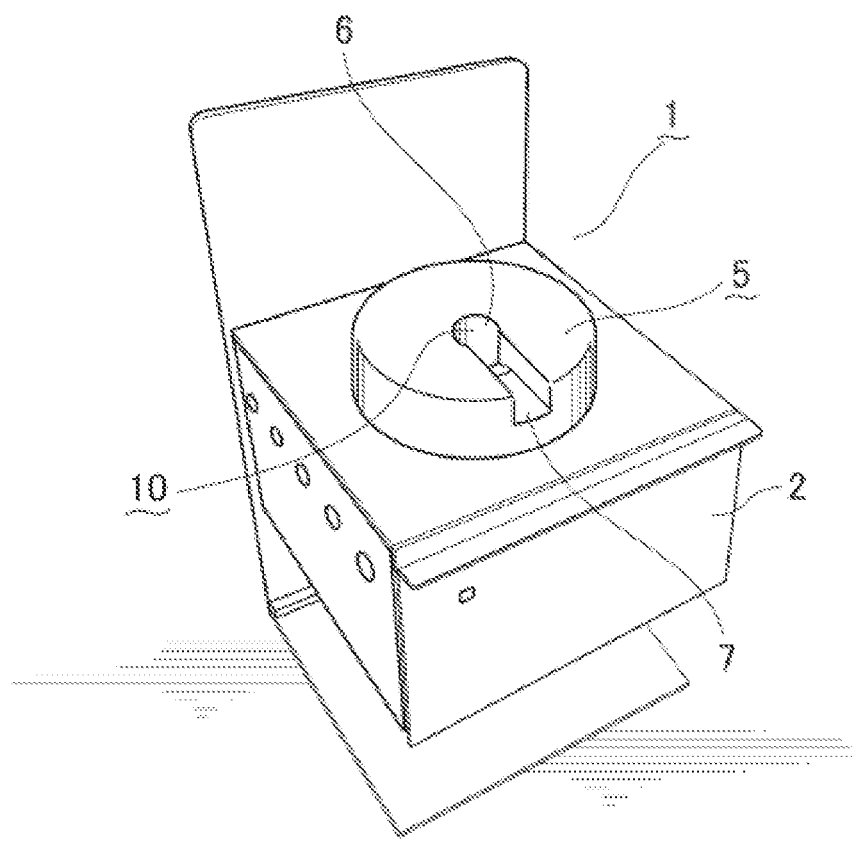
FIG. 1 is an explanatory view showing Example 1.
Figure 2:
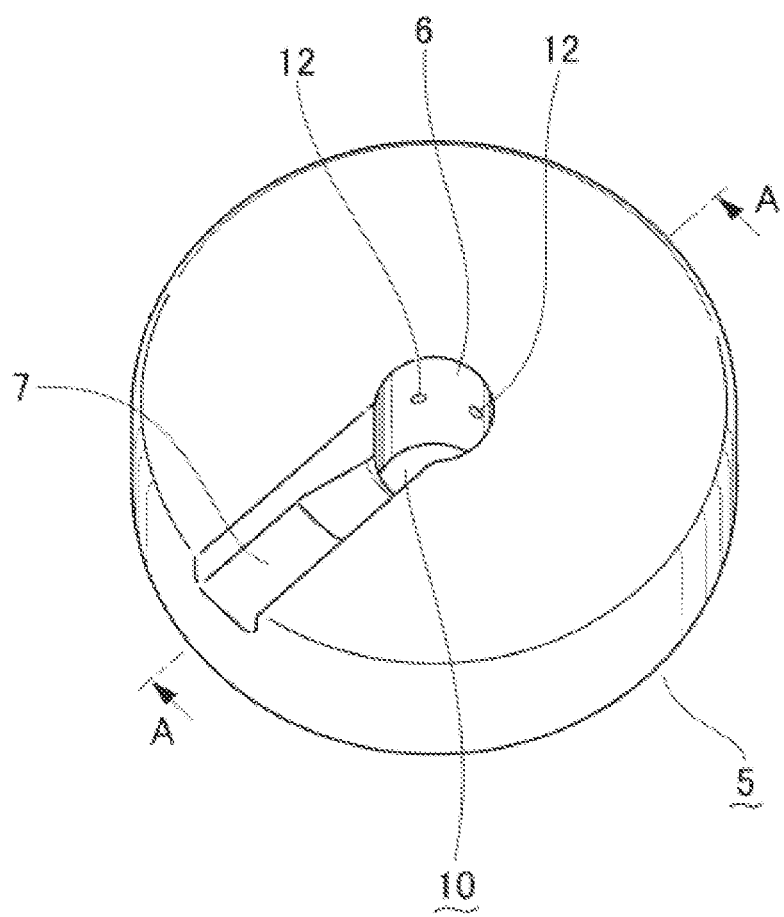
FIG. 2 is an explanatory view showing Example 1.
Figure 3:
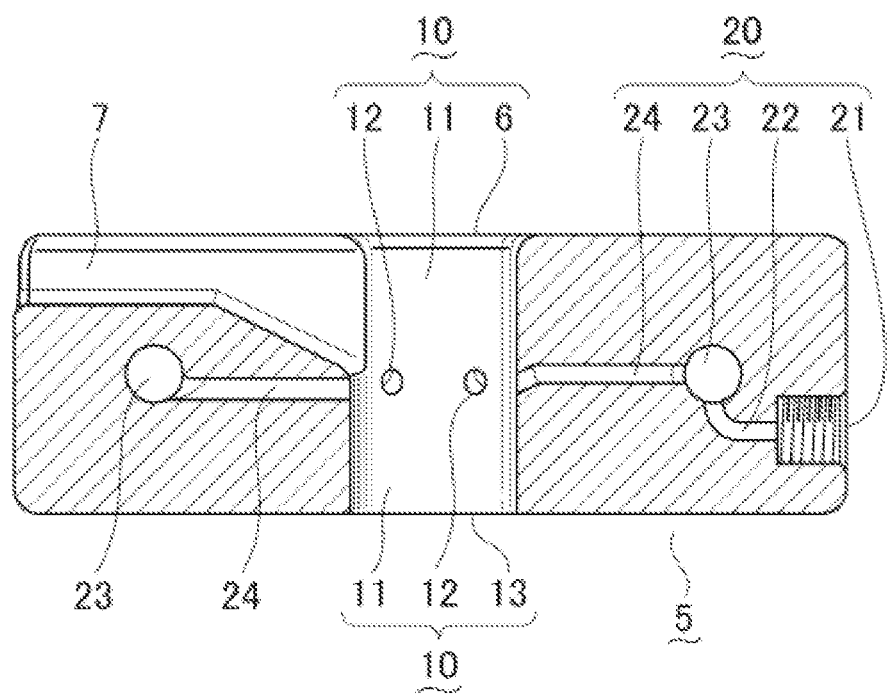
FIG. 3 is an explanatory view showing Example 1 (cross-sectional view taken along line A-A in FIG. 2).

As shown in FIG. 1, an iron tip cleaner device (1) includes an air jetting body (5) and a box (2) disposed below the air jetting body. The air jetting body (5) is formed in a substantially donut shape whose center is hollowed out in a cylindrical shape, and includes a cleaner chamber (10) which is a portion corresponding to the hollowed-out cylinder in the center. As shown in FIGS. 2 and 3, the cleaner chamber (10) is a cylindrical space in which a top surface is an iron tip insertion slot (6) having a circular opening, side surfaces are walls (11), and a bottom surface is a lower opening (13) having a circular opening that is open toward the box provided below. The wall surface (11) is provided with an air jetting hole (12) that serves as an outlet for air to be jetted to the iron tip.

Figure 9:
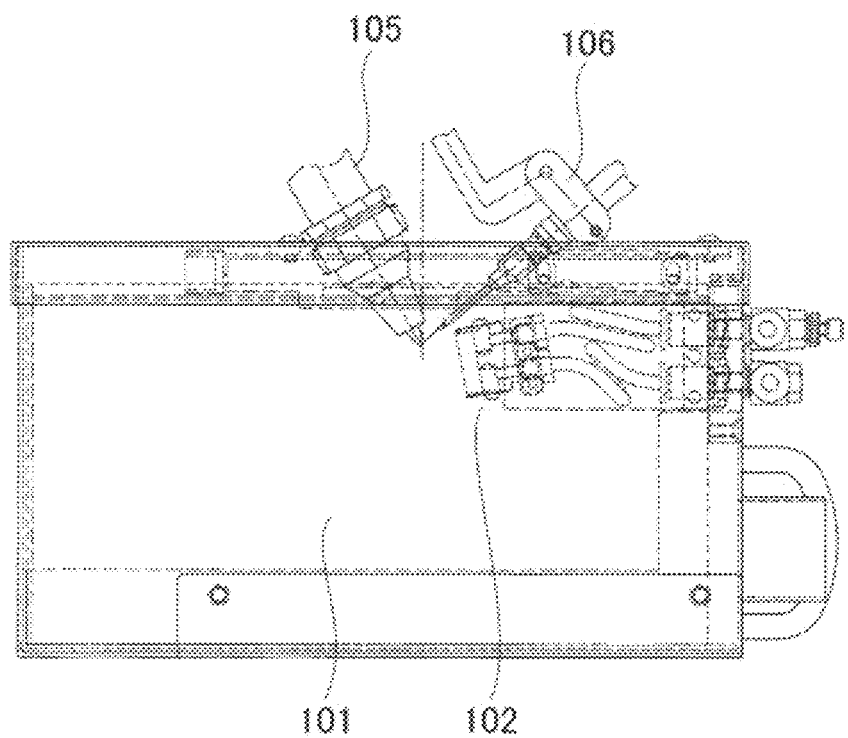
FIG. 9 is an explanatory view showing a conventional example.
Figure 10:
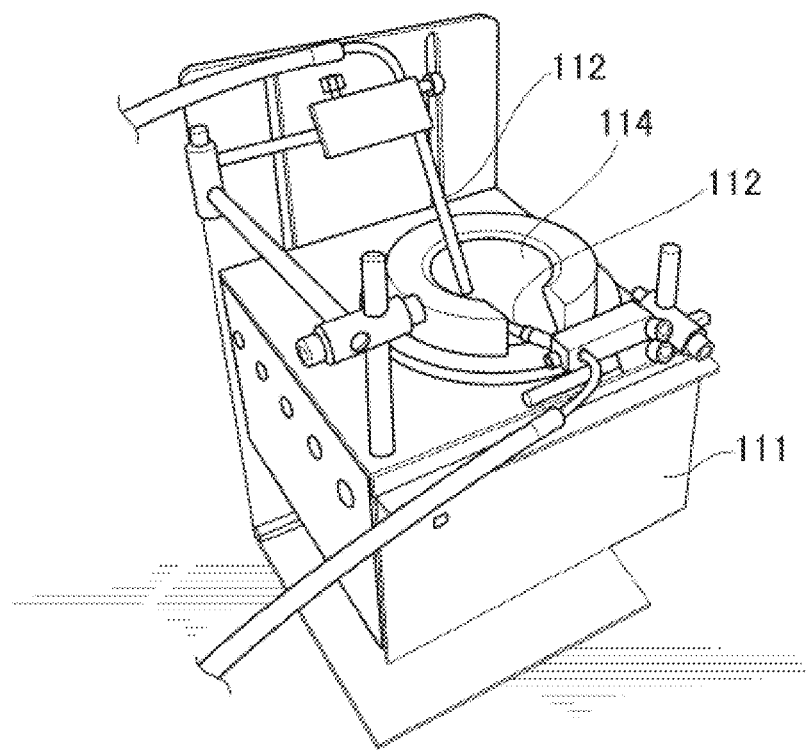
FIG. 10 is an explanatory view showing conventional example.

In a soldering iron that is widely used in the industry at present, a portion for feeding a thread solder (for example, a solder feeder 106 in FIG. 9) moves following the soldering iron. Therefore, when the iron tip is inserted into the iron tip insertion slot (6) from above, the solder feeder collides with the air jetting body, which hinders the insertion of the iron tip. For this reason, a notch (7) is provided in order to allow the solder feeder to escape from the collision. In other words, position and shape of the notch (7) change according to position and shape of the solder feeder.

Figure 4:
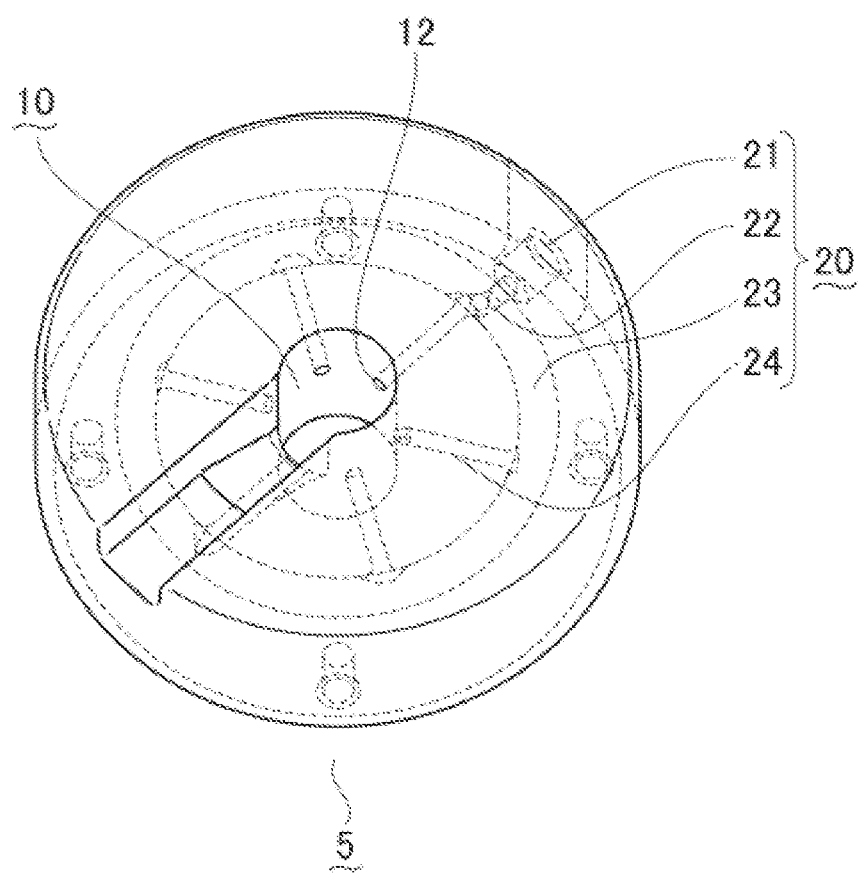
FIG. 4 is an explanatory view showing Example 1.

A mechanism of an air path (20) will be described with reference to FIGS. 3, 4, and 5. The air path (20) is a mechanism for sending air, which is jetted from the air jetting body (5) toward the cleaner chamber (10), to the air jetting body (5) from an air feeding means (not shown). The air path is connected in this order of an air feeding hole (21) into which air is supplied from the air supply means, a connecting duct (22) that connects the air feeding hole (21) and an annular duct (24), the annular duct (24) extending in an annular shape around the central cleaner chamber (10), jetting hole ducts (25a, 25b, 25c, 25d, 25e, and 25f) extending from the annular duct (24) toward the air jetting holes (12a, 12b, 12c, 12d, 12e, and 12f), respectively, and air jetting holes (12a, 12b, 12c, 12d, 12e, and 12f) that are opened toward the cleaner chamber (10), respectively. The air sent from the air feeding hole (21) is sent to the annular duct (23) through the connecting duct (22). When the air is sent through the annular duct, it is possible to minimize the resistance that impedes the flow of air. The air, which has passed through the annular duct (23), is jetted from the jetting hole (12) through the jetting hole duct (24) while maintaining the momentum. An air jetting direction is affected by a direction of the jetting hole duct. In Example 1, the direction of the jetting hole is directed to a center of the annular duct (that is, a center of the cleaner chamber) as shown in FIG. 6(a).

Figure 5:
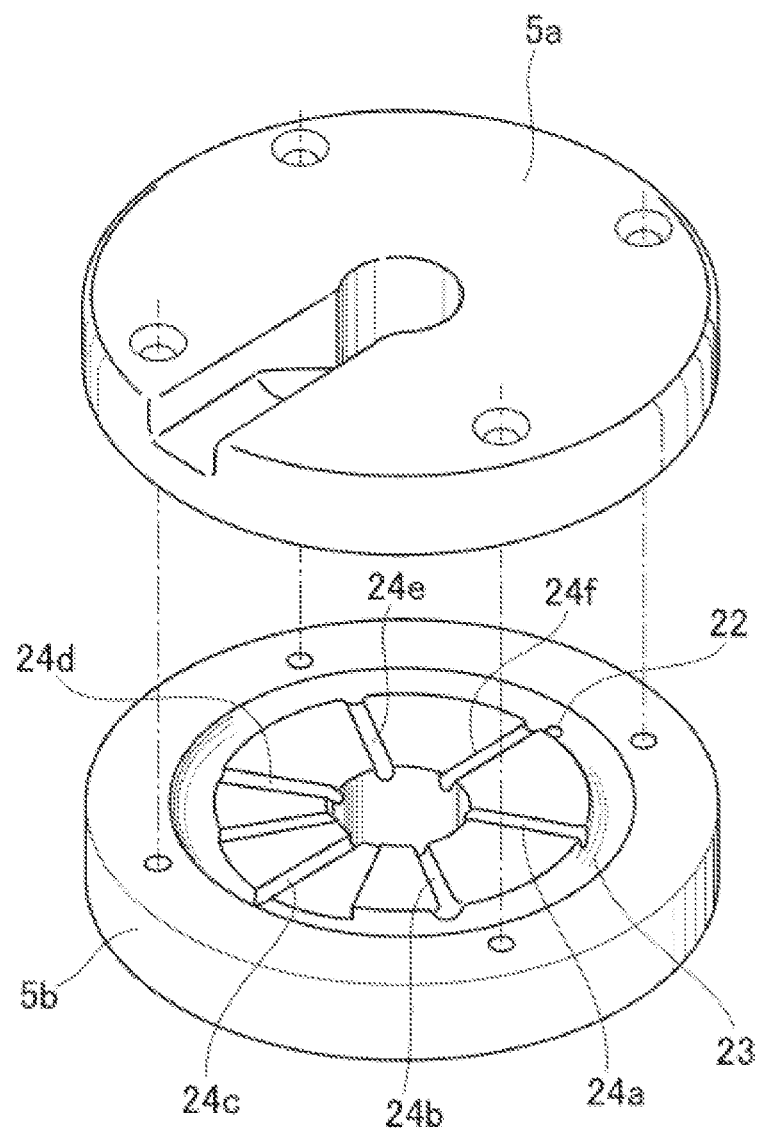
FIG. 5 is an explanatory view showing Example 1.
Figure 6A:
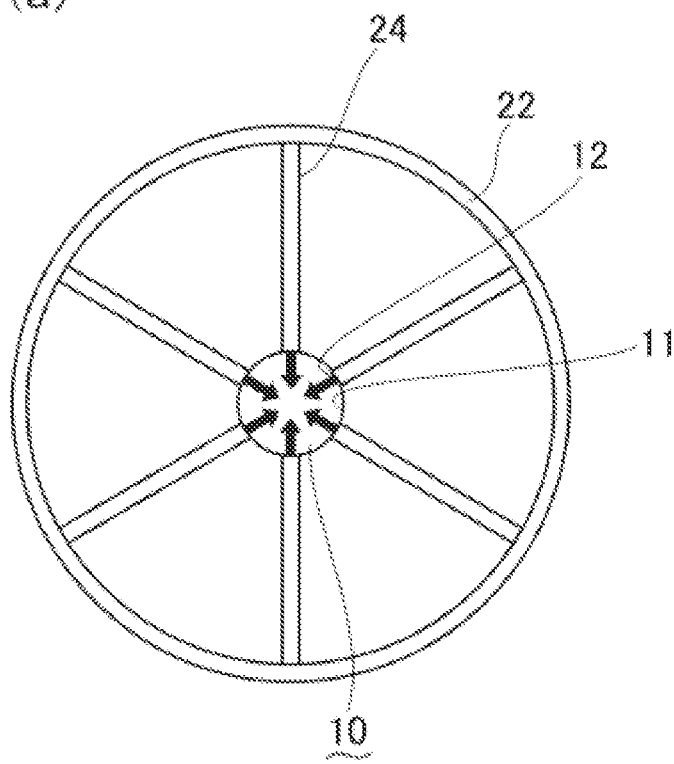
FIG. 6(*a*) is an explanatory view showing Example 1, and FIG. 6(*b*) is an explanatory view showing Example 2.

FIG. 5 shows a specific assembly example of the air jetting body. In other words, the other member including a recess having a shape shown in 5b formed inside are combined with one member (5a), thereby assembling the air jetting body.

Figure 7:
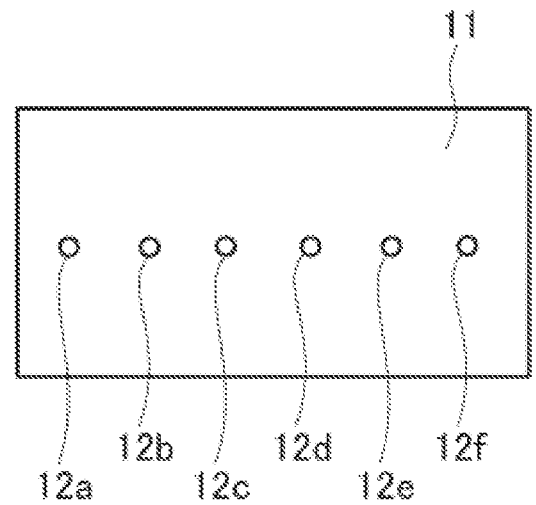
FIG. 7(*a*) is an explanatory view showing Example 1, and FIG. 7(*b*) is an explanatory view showing Example 3.
Figure 7:
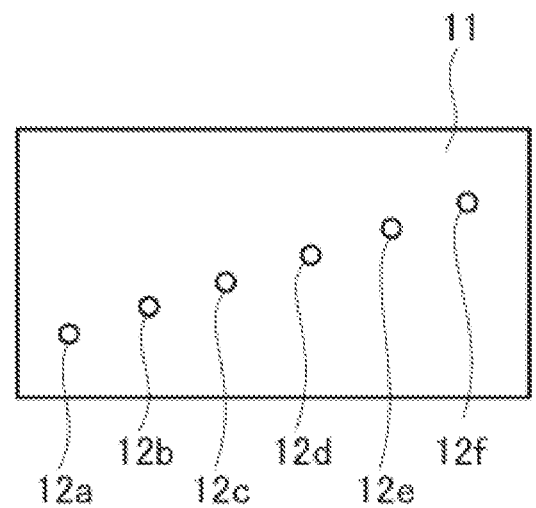
Figure 8:
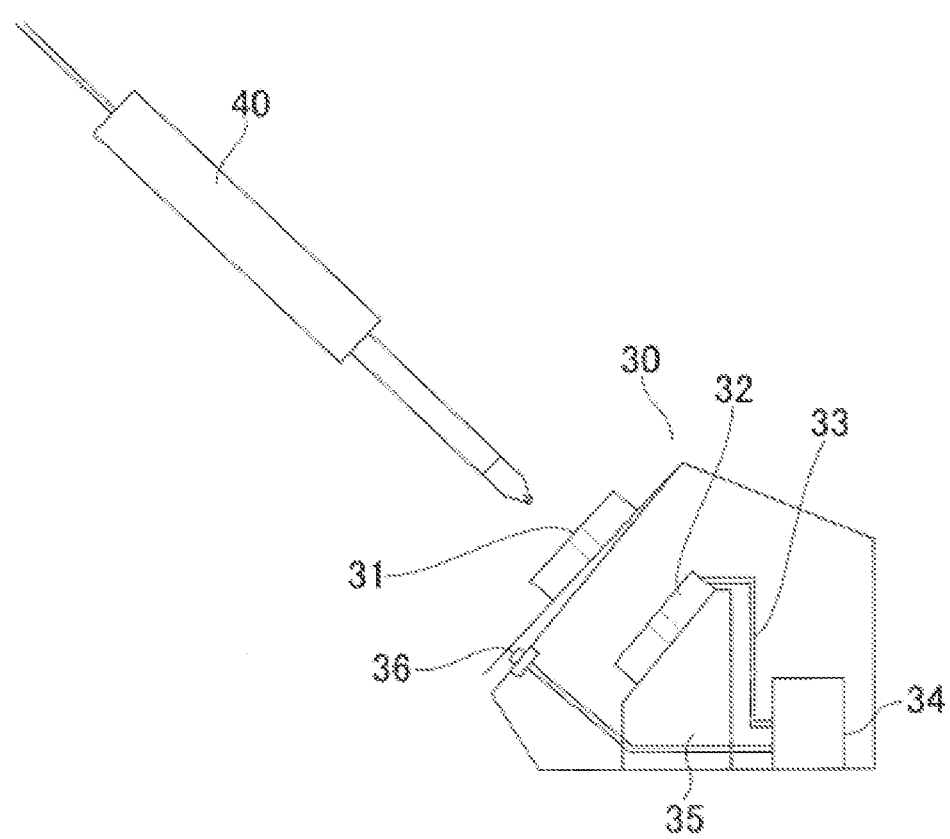
FIG. 8 is an explanatory view showing Example 4.

When the wall (11) is expanded and represented as a flat surface, opening positions of the air jetting holes 12 are as shown in FIG. 7(a). In other words, six air jetting holes 12 are evenly arranged and opened in a straight line in a horizontal direction (12a, 12b, 12c, 12d, 12e, and 12f). When the air jetting direction described above is also considered, in Example 1, the air is jetted from all the air jetting holes toward a certain point of the center in the horizontal direction of the cleaner chamber.

Since the cleaner chamber has the cylindrical shape, the air blown toward the center of the cylindrical shape in a circumferential direction collides with the wall facing air jetting holes. Since the six air jetting holes are provided in the horizontal direction and the air is vigorously jetted from each of the jetting holes and collides with the walls facing each other, the air inside the cleaner chamber goes in various directions. The iron tip of the soldering iron is subjected to various cuttings, and it is necessary to blow air from various directions according to a direction and a length of the cutting in order to blow off the solder on the iron tip. As described above, since the air flows in various direction inside the cleaner chamber, the solder on the iron tips of various shapes can be blown off in such a manner that the iron tip is placed in an appropriate position in the convection.

Example 2

Figure 6B:
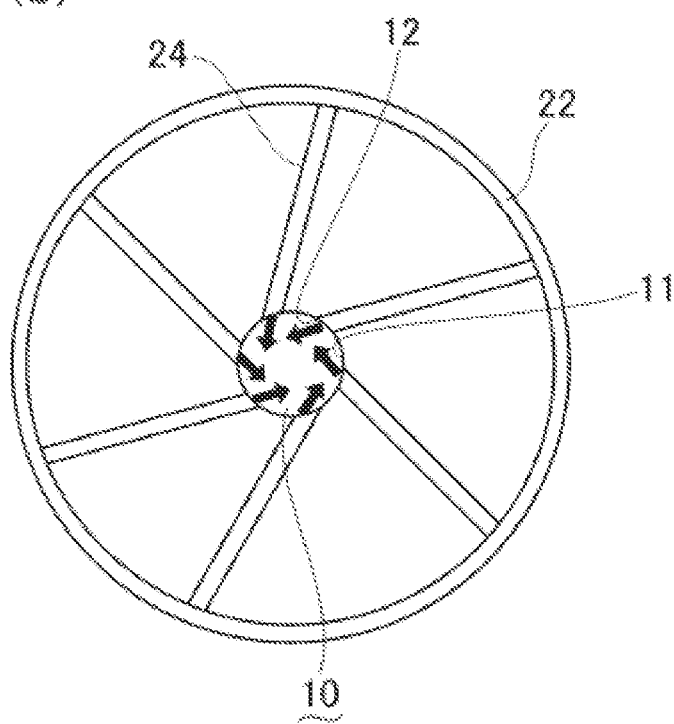

In Example 2, as shown in FIG. 6(b), the jetting hole duct (24) does not extend toward the center of the cleaner chamber (10), but extends in a direction deviated from the center by a predetermined angle. For this reason, in Example 2, the air jetted from the jetting hole (24) toward the cleaner chamber (10) flows in directions of black arrows in FIG. 6(b). The air jetted from the jetting hole collides with the wall in the blowing direction. Since all the air jetted from the six jetting holes collide with the walls in the air blowing direction, respectively, convection different from that in Example 1 is generated. For example, when the jetting hole duct (24) is tilted about 3 degrees from the center of the cleaner chamber (10), convection effective as a cleaner is generated.

Example 3

In Example 3, as shown in FIG. 7(b), a plurality of jetting holes (12a to 12f) are opened side by side with an inclination in the horizontal direction. Therefore, a type of convection different from that in Examples 1 and 2 is generated.

Example 4

Example 4 relates to an iron tip cleaner device (30) in a case where soldering is performed manually. The iron tip cleaner device (30) includes a cleaning pot (32) and a box (35) configured to accommodate the solder removed by the cleaning pot. A cleaner chamber and an air path (which are not shown) similar to those in Example 1 are provided. Air is sent to the cleaning pot (32) through an air feeding duct (33). A worker inserts an iron tip of a soldering iron (40) into the cleaning pot (32) through a guide port (31). When an air feeding switch (36) is pressed, air is fed to the cleaning pot (32) through an electromagnetic valve (34) and solder on the iron tip is removed. The air feeding switch (36) can also be configured such that the air feeding switch (36) is automatically turned on when the soldering iron (40) is inserted into the guide port (31).

REFERENCE SIGNS LIST 1 iron tip cleaner device
2 box
5 air jetting body
6 iron tip insertion slot
7 notch
10 cleaner chamber
11 wall
12a, 12b, 12c, 12d, 12e, 12f air jetting hole
13 lower opening
20 air path
21 air feeding hole
22 connecting duct
23 annular duct
24a, 24b, 24c, 24d, 24e, 24f jetting hole duct
30 iron tip cleaner device
31 guide port
32 cleaning pot
33 air feeding duct
34 electromagnetic valve
35 box
36 air feeding switch
40 soldering iron
101 cleaner box
102 nozzle member
105 nozzle member
111 cleaner box
112 air nozzle
114 opening

The invention claimed is:
1. An iron tip cleaner device for a soldering iron, comprising:
   a cleaner chamber including
      a wall surface and a plurality of air jetting holes that is provided in the wall surface and jets air for blowing off solder on an iron tip, wherein jetting hole ducts having end portions as the plurality of air jetting holes are provided, an annular duct is provided, from which the air is supplied to the jetting hole ducts, wherein the jetting hole ducts are extending from the annular duct to the plurality of air jetting holes, and a direction of the air jetted into the cleaner chamber is restricted by a direction in which the jetting hole ducts face the cleaner chamber.

2. The iron tip cleaner device for the soldering iron according to claim 1, wherein the solder on the iron tip is blown off by convection air generated when the air jetted from the plurality of air jetting holes collides with the wall surface.

3. The iron tip cleaner device for the soldering iron according to claim 1, wherein the cleaner chamber is a cylindrical space, and the cleaner chamber further includes a top surface on which an opening portion is provided such that the iron tip is inserted and a side surface on which the wall surface is provided.

4. The iron tip cleaner device for the soldering iron according to claim 1, wherein the plurality of air jetting holes is arranged in a row in a horizontal direction.

5. The iron tip cleaner device for the soldering iron according to claim 1, wherein the air is jetted from the plurality of air jetting holes toward a center of the cleaner chamber in a circumferential direction.

6. The iron tip cleaner device for the soldering iron according to claim 1, wherein the air emitted from the plurality of air jetting holes forms an air vortex.

7. The iron tip cleaner device for the soldering iron according to claim 1, further comprising:

a box that accommodates the blown solder, wherein the cleaner chamber further includes a bottom surface on which an opening portion is provided to be opened toward the box.

8. The iron tip cleaner device for the soldering iron according to claim 1, further comprising:

an air jetting body having a cylindrical space, wherein the cylindrical space defines the cleaner chamber, the cleaner chamber further includes an opening, at one end, configured to receive the iron tip, the wall surface of the cleaner chamber is defined by an inner side surface of the air jetting body, and the plurality of air jetting holes is spaced equally apart from each other in a circumferential direction of the cleaner chamber.

9. The iron tip cleaner device for the soldering iron according to claim 8, wherein each of the jetting hole ducts extends in a direction deviated from a center of the cylindrical space by a predetermined angle, and each of the plurality of air jetting holes faces the wall surface and is configured to jet the air against the wall surface.

10. The iron tip cleaner device for the soldering iron according to claim 8, wherein the plurality of air jetting holes includes a first air jetting hole closest to the opening in an axial direction of the cleaner chamber, and a second air jetting hole farthest from the opening in the axial direction.

11. The iron tip cleaner device for the soldering iron according to claim 10, wherein a distance of each of the plurality of air jetting holes to the opening is gradually increased in an order from the first air jetting hole to the second air jetting hole.

* * * * *